United States Patent

Chen

| [11] | Patent Number: | 5,092,560 |
|---|---|---|
| [45] | Date of Patent: | Mar. 3, 1992 |

[54] AUTOMATIC FLOW CONTROL WATER TAP WITH MANUAL CONTROL FUNCTION

[76] Inventor: Jan-Sun Chen, 5F., No. 293, Sec. 5, Chung Hsiao East Rd., Taipei, Taiwan

[21] Appl. No.: 658,149

[22] Filed: Feb. 20, 1991

[51] Int. Cl.⁵ .................. F16K 31/40; F16K 31/05; E03C 1/05
[52] U.S. Cl. ............... 251/30.03; 251/129.03; 251/129.04; 251/129.11; 4/623
[58] Field of Search .......... 251/30.03, 129.03, 129.04, 251/129.11; 4/623

[56] References Cited

U.S. PATENT DOCUMENTS 4,995,585 2/1991 Gruber et al. ............. 251/129.04 X

*Primary Examiner*—Arnold Rosenthal
*Attorney, Agent, or Firm*—Varndell Legal Group

[57] ABSTRACT

A water tap, comprising a motor-control water supply mechanism controlled by an infrared sensor via a control circuit board to open or stop the water passage therein automatically, and a manual-control water supply mechanism controlled by a revolving knob to open or stop the water passage therein manually during power failure.

1 Claim, 6 Drawing Sheets

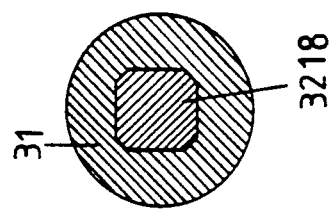
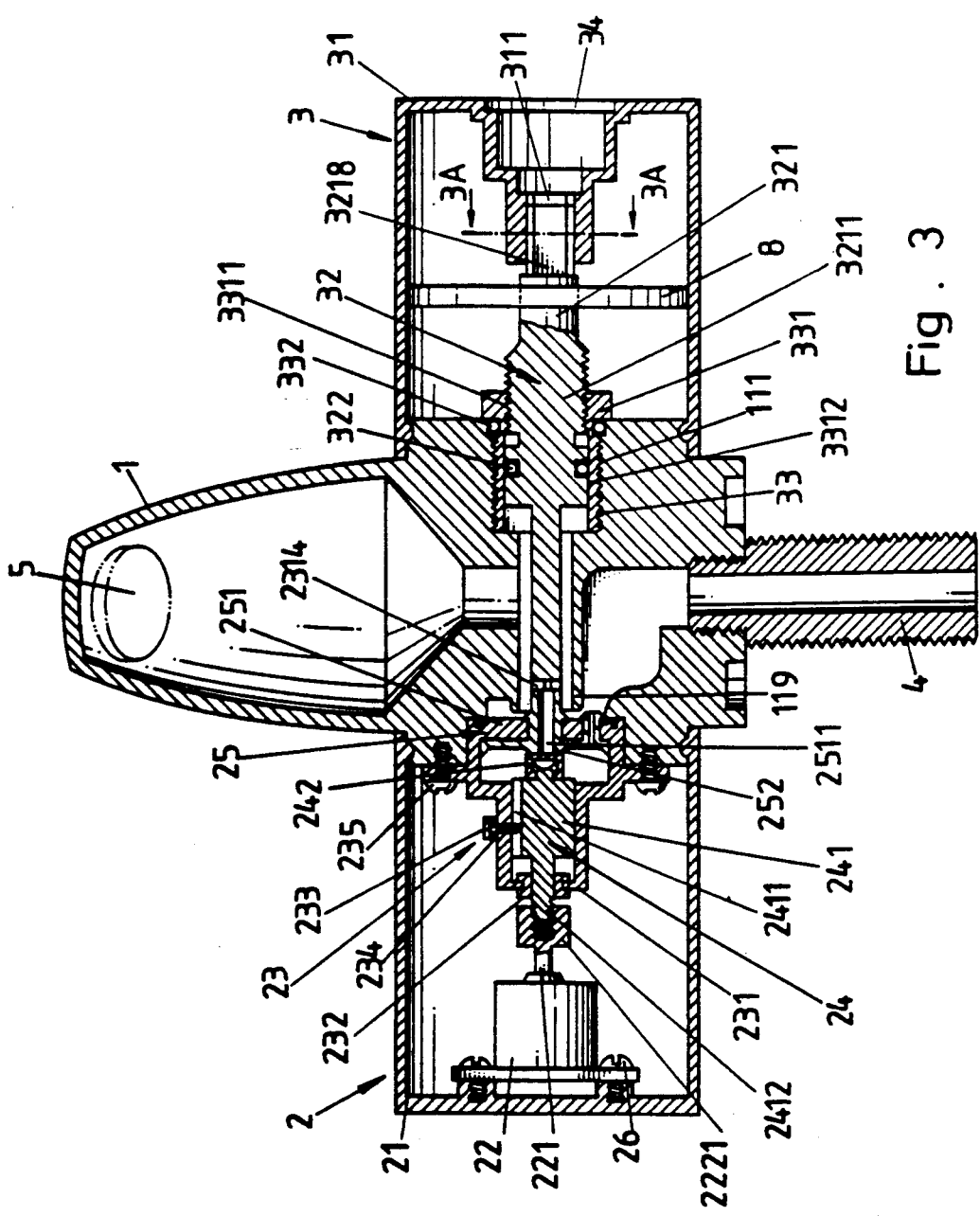

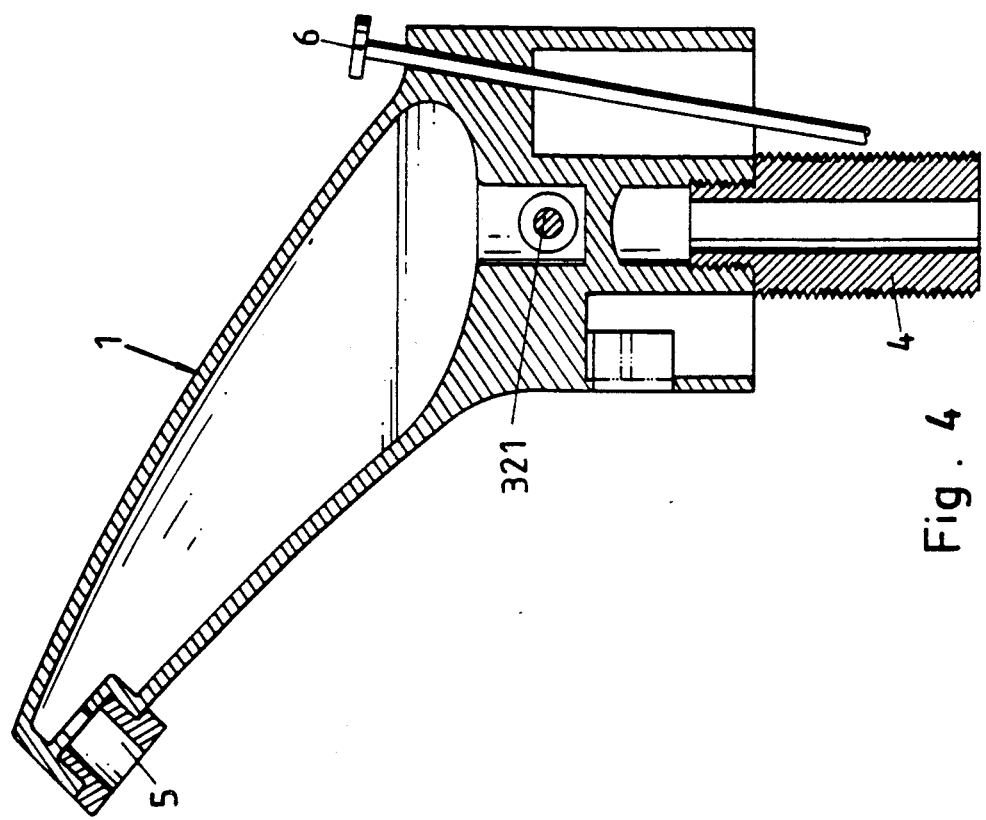

AUTOMATIC FLOW CONTROL WATER TAP WITH MANUAL CONTROL FUNCTION

BACKGROUND AND SUMMARY OF THE INVENTION

The present invention relates to water taps, and more particularly relates to an automatic flow control water tap which controls flow of water automatically and can also be operated through manual control during power failure.

BRIEF DESCRIPTION OF THE DRAWINGS

FIG. 3 is a longitudinal sectional front view showing the internal structure of the preferred embodiment of the automatic flow control water tap of the present invention.

FIG. 3A is a sectional view taken on line 3A—3A of FIG. 3.

FIG. 4 is a sectional side view of the preferred embodiment of the automatic flow control water tap of the present invention.

DETAILED DESCRIPTION OF THE PREFERRED EMBODIMENT

Figure 1:
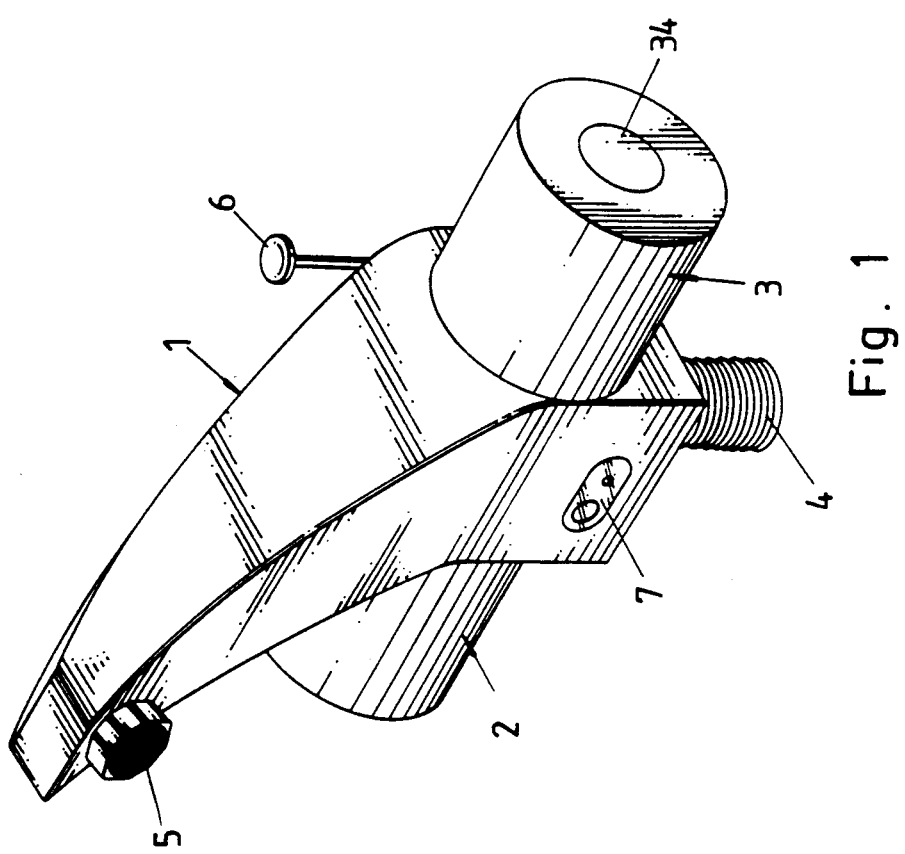
FIG. 1 illustrates the preferred embodiment of the automatic flow control water tap of the present invention.
Figure 2:
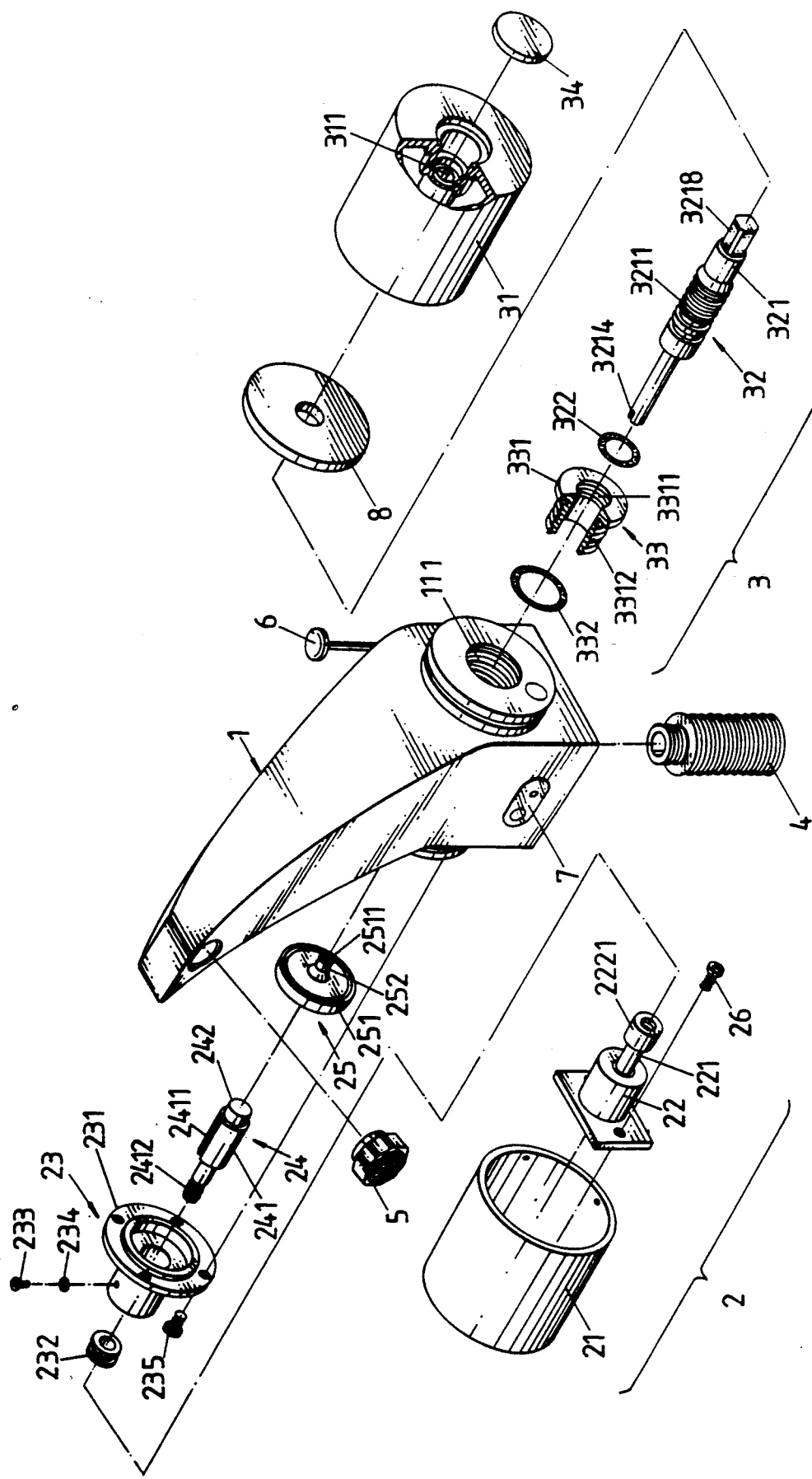
FIG. 2 is a perspective dismantled view of thereof.
Figure 5A:
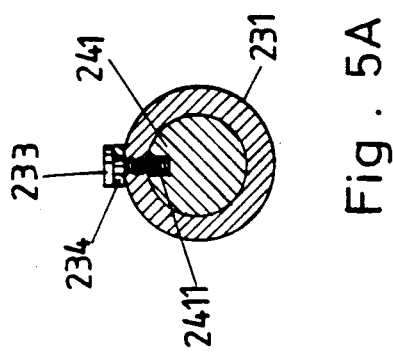
FIG. 5A is a sectional view taken on line 5A—5A of FIG. 5.
Figure 5:
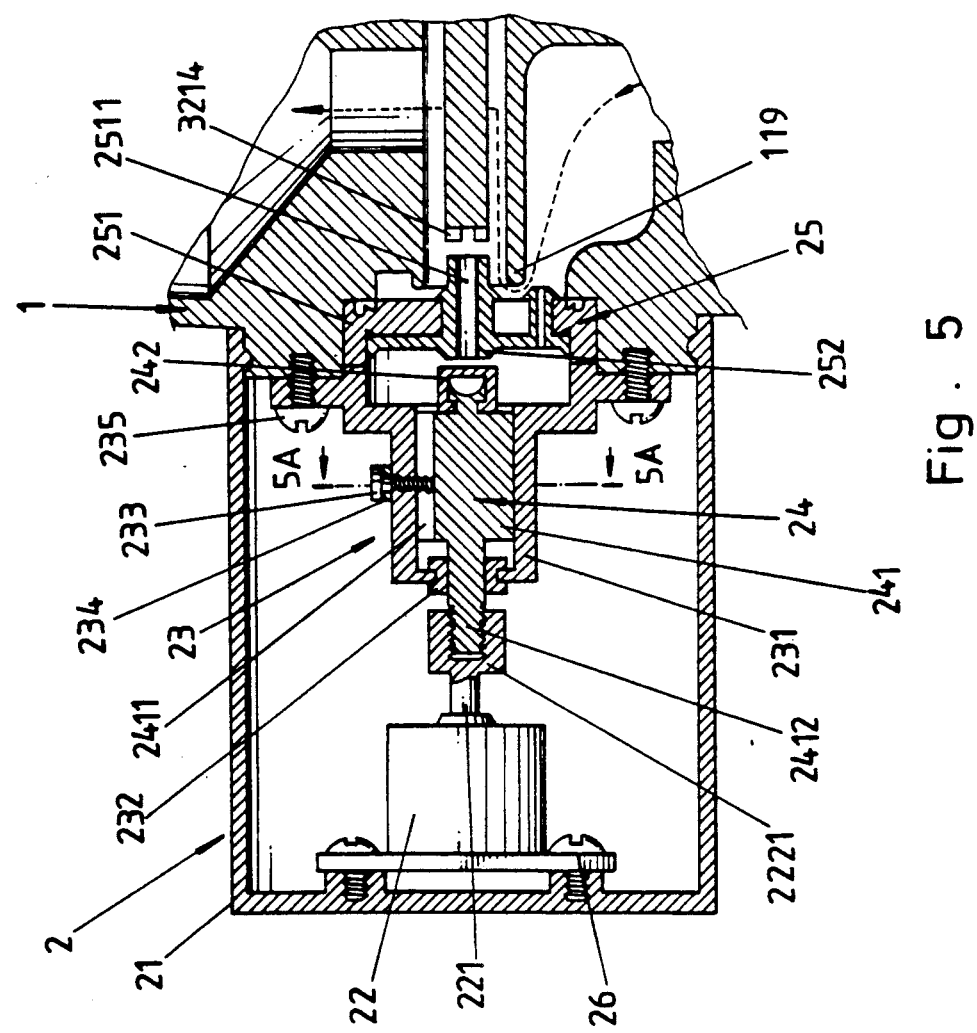
FIG. 5 is a schematic sectional view showing the operation of the motor-control water supply mechanism to move the control valve from the water passage permitting flow of water to pass therethrough.
Figure 6:
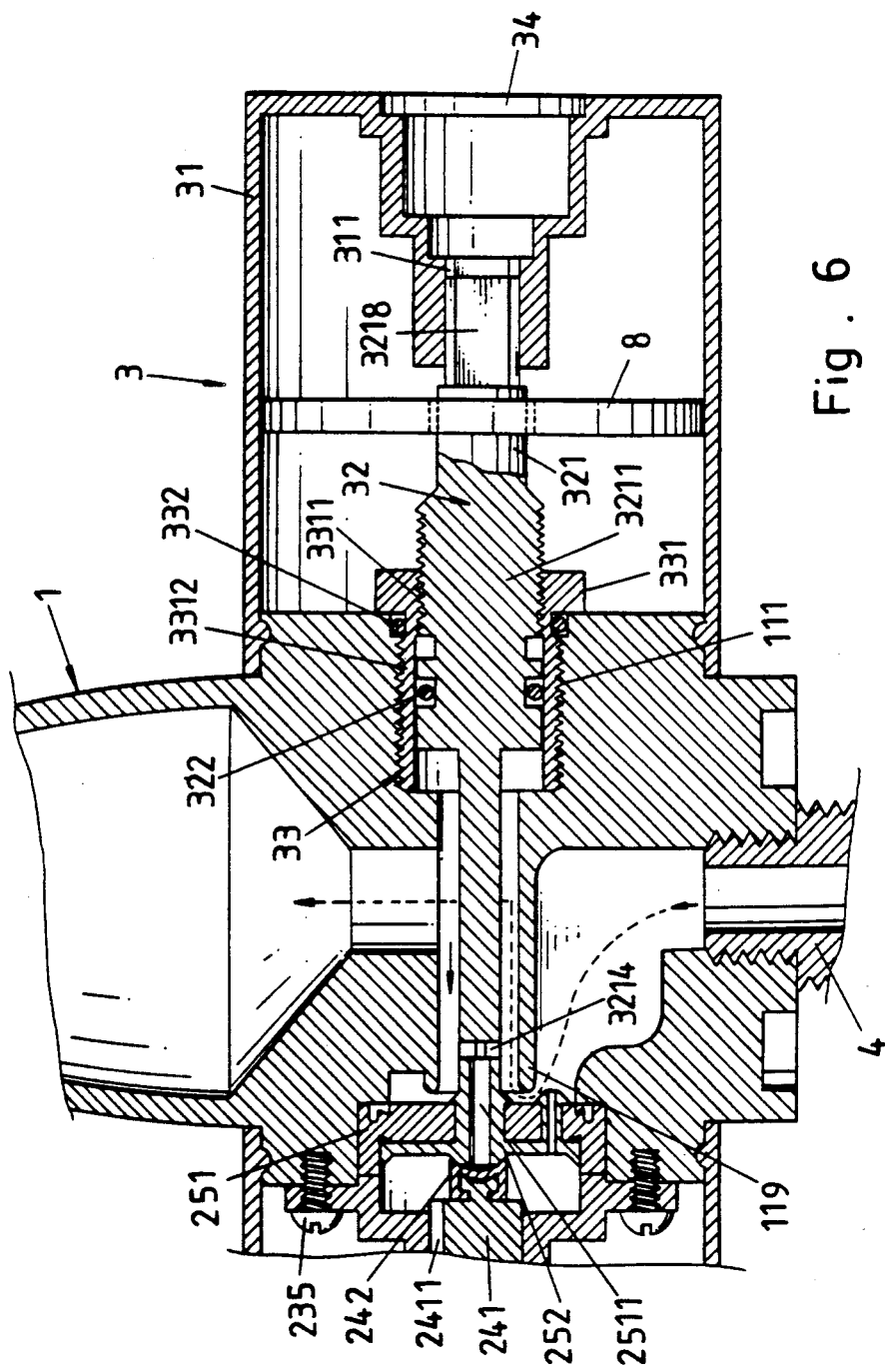
FIG. 6 is a schematic drawing showing the operation of the manual-control water supply mechanism.

Referring to FIGS. 1 and 2, therein illustrated is the preferred embodiment of the present invention which is generally comprised of a casing 1, a motor-control water supply mechanism 2, a manual-control water supply mechanism 3, a water intake pipe 4, a water outlet cap 5, a pull rod 6, an infrared sensor 7 and a control circuit board 8. Inside the casing 1 there is provided a water passage for guiding water from the water intake pipe 4 to discharge out of the water outlet cap 5 by means of the control of a control valve 25 which is comprised of a rubber cushion 251 and a valve flap 252 and driven to close or open said water passage by the motor-control water supply mechanism 2 which is set at the left side of the casing 1, or by the manual-control water supply mechanism 3 which is set at the right side of the casing 1. The infrared sensor 7 is mounted on the front side of the casing 1 at a suitable location. The pull rod 6 is mounted on the casing 1 at the back side.

Referring to FIG. 3 to FIG. 6, the motor-control water supply mechanism 2 comprises a motor 22 fastened in a motor case 21 by screw 26 whcih motor 22 has a connector 2221 coupled with the motor shaft 221 thereof for connecting a water stop control rod 24. The water stop control rod 24 has an elongated groove 2411 longitudinally made on the body 241 thereof at the top, an outer thread 2412 at one end inserted through the body 231 of a holder plate 23 and fastened with the inner thread of the connector 2221, and a stub rod 242 at an opposite end stopped at the control valve 25. The holder plate 23 is fastened in a side wall 119 inside the casing 1 by screws 235 with a gasket ring 232 set therein to seal the gap between the water stop control rod 24 permitting the water stop control rod 24 to be driven by the motor 22 to move forward and backward. The holder plate 23 has a hole at a suitable location through which a screw 233 which is mounted with a washer 234 is inserted in the elongated groove 2411 of the water stop control rod 24. The manual-control water supply mechanism 3 comprises a connector 33 of which the body 331 has an outer thread 3312 fastened in a bolt hole 111 on the casing 1 with a seal ring 332 fastened therebetween and an inner thread 3311, a guide rod 32 of which the body 321 has an outer thread 3211 at the middle screwed with the inner thread 3311 of the connector 33 with a seal ring 322 fastened therebetween, a notch 3214 at one end disposed in the center hole 2511 of the control valve 25 to let water pass therethrough, and a square rod portion 3218 at an opposite end inserted through the control circuit board 8 and fastened in a square hole 311 at the center of a revolving control knob 31 which is covered with an ornament cap 34.

The operation of the present invention is now outlined hereinafter. When user's hands are disposed below the water outlet cap 5 the infrared sensor 7 immediately gives a signal to the control circuit board 8 to drive the motor 22 to rotate clockwise. Clockwise rotation of the motor 22 causes the water stop control rod 24 to rotate. Because the screw 233 is inserted in the elongated groove 2411 of the water stop control rod 24, clockwise rotation of the motor 22 drives the water stop control rod 24 to move backward so as to carry the stub rod 242 to leave from the center hole 2511 of the control valve 25. Thus, the water passage (see FIG. 5) becomes opened to let water pass therethrough for discharge through the water outlet cap 5. As soon as user's hands are moved away, signal from the infrared sensor is stopped and, the control circuit board 8 drives the motor 22 to rotate counter-clockwise for a measured time so as to move the water stop control rod 241 forward, permitting the stub rod 242 to seal the center hole 2511 of the control valve 25 again.

During power failure, the present invention can be controlled through the manual-control mechanism 3. Rotating the revolving control knob 31 causes the guide rod 32 to rotate forward or backward in the connector so that the notch 3214 can be carried in or out of the center hole 2511 of the control valve 25 to further control the opening of the water passage (see FIG. 6).

I claim:

1. A water tap, comprising a casing having a water intake pipe at one end connected to a water supply, a water outlet hole at an opposite end, a water passage disposed between said water intake pipe and said water outlet hole, a control valve set in said water passage, said control valve having a center hole disposed in communication with said water passage, an infrared sensor for proximity detection of the reach of hands, a control circuit board controlled by said infrared sensor to drive a motor-control water supply mechanism to close or open the center hole of said control valve, and a manual-control water supply mechanism for controlling said control valve to open or close through manual control, and characterized in that:

said motor-control water supply mechanism comprises a motor having a bolt coupling connected to the motor shaft thereof, a holder plate fastened inside said casing, a water stop control rod inserted through said holder plate with a gasket ring set therebetween, said water stop control rod having an outer thread portion at one end screwed in the inner thread of said bolt coupling, an elongated groove longitudinally disposed at the top and a stub rod at an opposite end stopped in the center hole of said control valve, said holder plate having a screw fastened therethrough in a radial direction and in said elongated groove to confine said water stop control rod to move in axial direction;

said manual-control water supply mechanism comprises a connector having an outer thread portion fastened in a bolt hole on said casing in communicating with said water passage with a seal ring mounted thereon for water leakage protection and an inner thread portion defined therein, a guide rod having an outer thread at the middle screwed with the inner thread of said connector with a seal ring mounted thereon for water leakage protection, a notch at one end disposed in the center hole of said control valve to let water pass therethrough, and a square rod portion at an opposite end inserted through said control circuit board and fastened in a square hole at the center of a revolving control knob; and wherein said infrared sensor detects the presence of user's hands to trigger said control circuit board to drive said motor to rotate closkwise for a measured time so as to drive said water stop control rod to carry said stub rod to leave away from the center hole of said control valve permitting flow of water to pass through said water passage for discharge through said water outlet hole;

said control circuit board triggers said motor to rotate counter-clockwise for a measured time when user's hands leave away, so as to drive said water stop control rod to move said stub rod to insert in the center hole of said control valve to further block up said water passage; and said guide rod can be driven to move forward or backward by said revolving control knob during power failure, so as to stop or open said control valve.

* * * * *